April 21, 1936.  H. H. WOOD  2,037,843
SEAL FOR BEARING CLOSURES
Original Filed Nov. 15, 1933
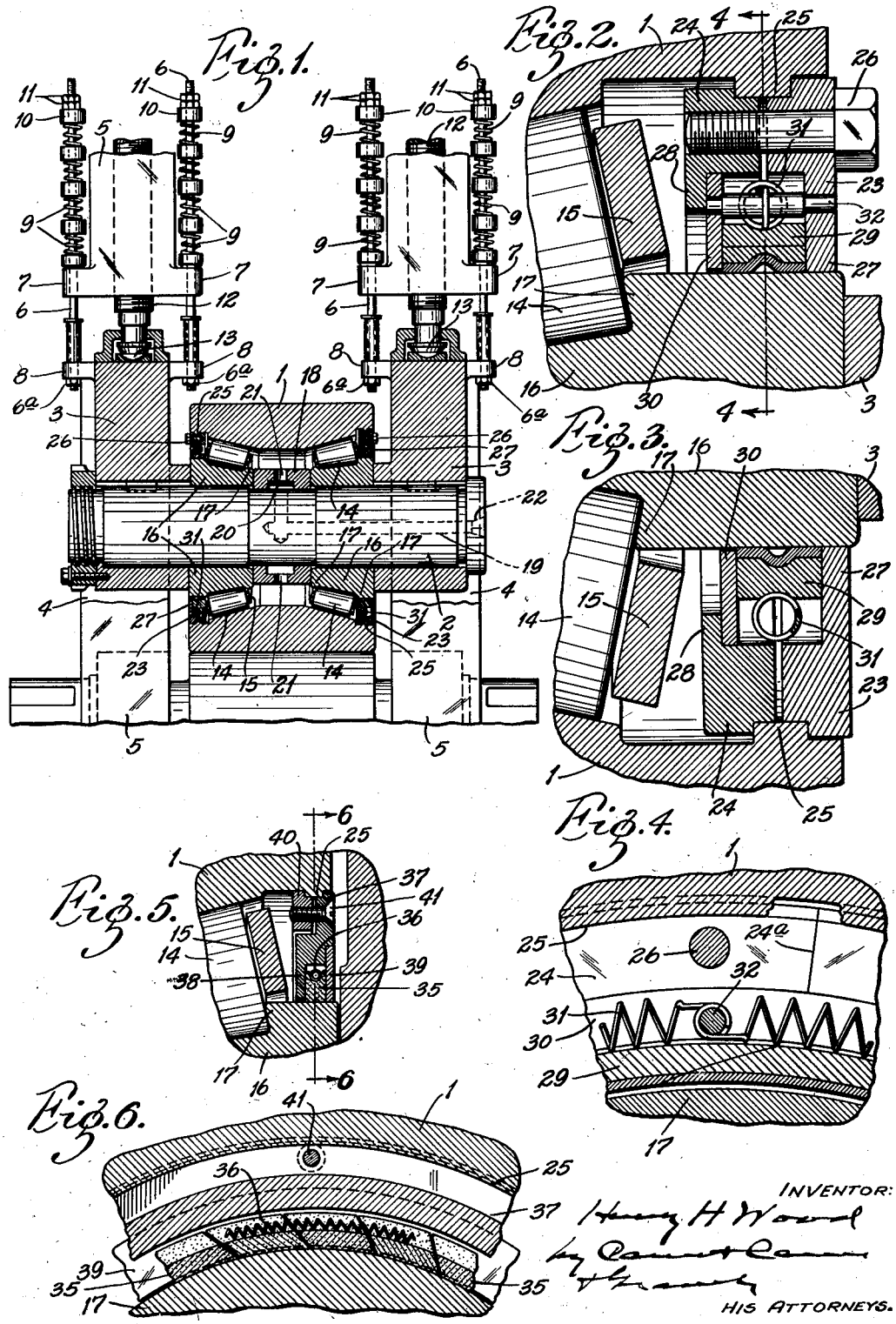
INVENTOR:
Henry H Wood
HIS ATTORNEYS.

Patented Apr. 21, 1936

2,037,843

UNITED STATES PATENT OFFICE 2,037,843

SEAL FOR BEARING CLOSURES

Henry H. Wood, Canton, Ohio, assignor to The Timken Roller Bearing Company, Canton, Ohio, a corporation of Ohio Original application November 15, 1933, Serial No. 698,104, now Patent No. 2,010,211, dated August 6, 1935. Divided and this application September 6, 1934, Serial No. 742,925

3 Claims. (Cl. 286—5)

The subject matter hereof is divided out of my pending application Serial No. 698,104 filed November 15, 1933, for patent for Rolling mill, now Patent No. 2,010,211, issued August 6, 1935.

The present invention relates to bearing closures, particularly to closures adapted for use with roller bearing mill roll constructions of the kind shown in said pending application. The principal object of the present invention is to provide a simple, efficient, economical and compact closure construction for roller bearings and to provide for the ready mounting and dismounting of said closure construction.

The invention consists in the roller bearing end closure construction and mounting, and in the parts, combinations and arrangements of parts hereinafter described and claimed.

In the accompanying drawing, which forms part of this specification, and wherein like symbols refer to like parts wherever they occur, Fig. 1 is a fragmentary view partly in section and partly in elevation of a roller bearing mill roll provided with an end closure construction embodying my invention;

Fig. 2 is a fragmentary axial section showing the manner of anchoring the retaining spring for the backing roll of the end closure;

Fig. 3 is a view similar to Fig. 2 illustrating in detail the end closure;

Fig. 4 is a transverse cross-section on the line 4—4 in Fig. 2;

Fig. 5 is a view similar to Fig. 1, illustrating a modified form of an end closure; and Fig. 6 is a transverse section on the line 6—6 in Fig. 5.

In the accompanying drawing, my invention is illustrated in connection with a roller bearing mill roll construction of the kind disclosed in the pending application hereinbefore referred to; but the invention is also applicable to other roller bearing constructions where it is desired to exclude foreign matter from and retain lubricant in the bearing.

In the construction shown in Fig. 1, the roll comprises a cylindrical shell 1 supported on a shaft or beam 2, which extends through said shell with its ends keyed in boxes 3 arranged to slide vertically in windows 4 provided therefor in roll stands 5. The boxes 3 are suspended from the tops of the roll stands 5 by means of vertical rods 6 that extend through outstanding lugs 7 and 8 on said stands and said boxes, respectively. The rods 6 are provided beneath the boxes with nuts 6a; and springs 9 are sleeved on said rods between the lugs 7 of the stands and washers 10 that are held on the rods by means of nuts 11. The boxes 3 are adjusted vertically in the windows 4 of the roll stands 5 by adjusting screws 12 that are threaded through vertical openings in the roll stands and have swivel connections 13 at their lower ends with the tops of said boxes.

The roller bearing construction for the roll 1 comprises two conical or taper roller bearings located one in each end of the backing roll. Each roller bearing comprises a circular series of conical bearing rollers 14 mounted in a suitable retaining cage 15 and interposed between the roll and a cone or inner bearing member 16, which is sleeved on the roll supporting shaft 2 and has the usual end thrust ribs 17. The roll 1 may be supported directly on the bearing rollers 14 or the usual cup or outer raceway member (not shown) may be interposed between said roll and said bearing rollers. A ring 18 is sleeved on the shaft 2 between the cones of the two bearings for spacing the bearing cones the desired distance apart.

Lubricant is supplied to the bearings through a passageway 19 that extends inwardly from one end of said shaft 2 and thence laterally and opens into an annular channel 20 in the spacing ring 18, which channel communicates through radial openings 21 in said ring with the space between the two bearings. The outer end of the passageway is closed by means of threaded plug 22.

The lubricant retaining and dust excluding means shown in Figs. 1 to 4, inclusive comprises two annular plates 23 and 24, respectively, mounted in each end of the backing roll 1 opposite the outermost thrust rib 17 of the cone 16 at said end of said roll. The annular plates 23 and 24 are arranged one on each side of an annular rib 25 formed in the inner periphery of the backing roll and are held together in abutting relation to said rib by means of a series of circumferentially spaced cap screws 26 that pass through the outer plate 23 and are threaded into the inner plate 24. By this arrangement, the two plates have an annular rib-and-groove connection with the roll 1.

The plates 23 and 24 have inwardly extending flanges 27 and 28, respectively, the flange 27 of the outer plate 23 closely fitting the outer cone rib 17 and the flange 28 of the inner plate 24 being spaced from said rib. A split or segmental packing ring 29 is located between the inwardly extending flange 27 of the outermost plate 23 and an annular plate 30 interposed between opposing faces of the inwardly extending flange 28 of the innermost plate 24 and said packing ring.

The packing ring 29 is held in engagement with the outer periphery of the cone rib 17 by means of a garter spring 31 that encircles the packing ring 29 and has its ends anchored to the flange 28 of the outermost plate 24 and the annular plate 30 by means of an anchor pin 32. As shown in Fig. 4, the inner plate 24 is divided, as at 24a, into segments so as to permit said plate to clear the rib 25 of the roll when the closure construction is assembled and disassembled. The outer plate may also be split or divided after the manner of the inner plate.

The modified bearing closure shown in Figs. 5 and 6 comprises a segmental packing ring 35, which closely embraces the thrust rib 17 at the large end of the cone 16. This segmental packing ring is yieldably held in engagement with the thrust rib of the cone by means of a garter spring 36 that is seated in a groove provided therefor in the outer periphery of said packing ring. An annular plate 37 is located in the annular space between the roll 1 and the thrust rib 17 at the outer end of the bearing cone. The annular plate 37 has an inwardly extending flange 38 on its inner face that is overlapped by an annular plate 39 fixed to the outer face of said annular plate, the plate and flange cooperating to form an annular channel for receiving the segmental packing ring 35. The annular plate 37 is arranged on the outer side of the annular rib 25 in the roll 1; and an annular plate 40 is arranged on the inner side of said rib. The plate 40 is divided into segments so as to permit it to clear said rib when inserted in and removed from the end of the roll. The two plates 37 and 40 are clamped together on opposite sides of the rib 25 by means of cap screws 41.

The hereinbefore described construction has numerous advantages. It provides a simple, efficient and compact arrangement for excluding foreign matter from and for retaining lubricant in the bearing and provides for the ready assembly and disassembly of parts. It also enables the closure to be rigidly secured in position without requiring holes to be drilled in the bearing members for the screws that secure the closure in place. Obviously, numerous changes may be made without departing from the invention. Therefore, I do not wish to be limited to the precise construction shown and described.

What I claim is:

1. In combination, a housing having a shaft receiving opening provided with an annular rib, a shaft mounted in said opening and of smaller size than the opening defined by said annular rib, and a closure construction for the annular space between said annular rib and said shaft, said closure construction comprising a packing ring encircling said shaft opposite said rib, annular plates disposed in said opening on opposite sides of and in overlapping relation to said annular rib, the innermost annular plate having a radial thickness less than the annular space between said shaft and said annular rib and being divided into segments so as to permit said segments to pass between said shaft and said annular rib when said closure construction is assembled and disassembled, and members for removably securing said annular plates together inwardly of said annular rib.

2. In combination, a housing having an opening provided with an annular rib, a member mounted in said opening and of smaller size than the opening defined by said annular rib, and a closure construction for the annular space between said annular rib and said member, said closure construction comprising a packing ring encircling said member opposite said rib, annular plates disposed in said opening on opposite sides of said annular rib and said packing ring, fasteners for removably securing said annular plates together, said fasteners being located inwardly of said annular rib, one of said annular plates being divided into segments so as to permit said plate to clear said annular rib when said closure construction is assembled and disassembled, a garter spring surrounding said packing ring, an anchor pin for said garter spring having one end mounted in the other of said annular plates, and an annular plate interposed between an inwardly extending flange on said segmental annular plate and the adjacent side of said packing ring and supporting the other end of said anchor pin.

3. In combination, a housing having an opening provided with an annular rib, a member mounted in said opening and of smaller size than the opening defined by said annular rib, and a closure construction for the annular space between said annular rib and said member, said closure construction comprising a packing ring encircling said member opposite said rib, a garter spring encircling said packing ring, an annular plate located in said opening with its inner portion overlapping the inner side of said packing ring and with its outer portion overlapping the outer side of said annular rib, an annular plate secured to said first mentioned annular plate and overlapping the outer side of said packing ring, a segmental annular plate located adjacent the inner face of said first mentioned annular plate with its outer margin overlapping the inner side of said annular rib, and fasteners for securing said first mentioned annular plate and said segmental annular plate together, said fasteners being located inwardly of said annular rib.

HENRY H. WOOD.